United States Patent
Iwase (10) Patent No.: US 10,504,638 B2
(45) Date of Patent: Dec. 10, 2019

(54) THERMISTOR AND DEVICE USING THERMISTOR

(71) Applicant: SEMITEC Corporation, Tokyo (JP)

(72) Inventor: Katsuhiko Iwase, Tokyo (JP)

(73) Assignee: SEMITEC Corporation, Tokyo (JP)

(*) Notice: Subject to any disclaimer, the term of this patent is extended or adjusted under 35 U.S.C. 154(b) by 0 days.

(21) Appl. No.: 16/061,658

(22) PCT Filed: Dec. 13, 2016

(86) PCT No.: PCT/JP2016/087007
§ 371 (c)(1),
(2) Date: Jun. 13, 2018

(87) PCT Pub. No.: WO2017/104645
PCT Pub. Date: Jun. 22, 2017

(65) Prior Publication Data
US 2018/0374614 A1    Dec. 27, 2018

(30) Foreign Application Priority Data
Dec. 18, 2015  (JP) ................. 2015-247882

(51) Int. Cl.
*H01C 7/00*     (2006.01)
*H01C 7/04*     (2006.01)
(Continued)

(52) U.S. Cl.
CPC .............. *H01C 7/008* (2013.01); *G01K 7/22* (2013.01); *H01C 1/14* (2013.01); *H01C 7/04* (2013.01)

(58) Field of Classification Search
CPC . H01C 7/008; H01C 1/14; H01C 7/04; G01K 7/22
See application file for complete search history.

(56) References Cited

U.S. PATENT DOCUMENTS 4,447,799 A * 5/1984 Carlson ................. G01K 7/223
                                                          29/613
4,647,895 A * 3/1987 Howng ................. H01C 7/043
                                                          252/519.1
(Continued)

FOREIGN PATENT DOCUMENTS

CN          103000320       3/2013
JP          04-070701       6/1992
(Continued)

OTHER PUBLICATIONS

JP 09-007803 machine translation. (Year: 1997).*
(Continued)

*Primary Examiner* — Kyung S Lee
(74) *Attorney, Agent, or Firm* — JCIPRNET (57) ABSTRACT

Provided are a thermistor and a device using the thermistor by which ohmic contact can be ensured between electrodes formed on a thermistor composition and wiring lines connected to the electrodes, and by which high accuracy temperature detection is possible. A thermistor is provided with a thermistor composition, a pair of electrodes that are formed on the thermistor composition and that contain a noble metal, wires that are joined to the electrodes and that have a passivation film formed on a surface thereof, and a junction material that contains a noble metal oxide which joins the electrodes to the wires.

20 Claims, 6 Drawing Sheets

(51) Int. Cl.
*G01K 7/22* (2006.01)
*H01C 1/14* (2006.01)

(56) References Cited

U.S. PATENT DOCUMENTS

| | | | | |
|---|---|---|---|---|
| 4,712,085 | A * | 12/1987 | Miki | G01K 7/223 |
| | | | | 29/612 |
| 4,752,762 | A * | 6/1988 | Inano | H01C 1/034 |
| | | | | 338/22 R |
| 6,248,978 | B1 * | 6/2001 | Okuda | G03G 15/2064 |
| | | | | 219/216 |
| 7,075,407 | B1 * | 7/2006 | Kawamoto | G01K 1/14 |
| | | | | 338/22 R |
| 8,228,160 | B2 * | 7/2012 | Kloiber | G01K 7/223 |
| | | | | 29/610.1 |
| 2006/0013282 | A1 * | 1/2006 | Hanzawa | G01K 1/08 |
| | | | | 374/163 |

FOREIGN PATENT DOCUMENTS

| | | |
|---|---|---|
| JP | 08-167502 | 6/1996 |
| JP | 09-007803 | 1/1997 |
| JP | 3650854 | 5/2005 |
| JP | 3661160 | 6/2005 |
| JP | 2007-141881 | 6/2007 |
| JP | 5437304 | 3/2014 |

OTHER PUBLICATIONS

JP 04-070701 machine translation. (Year: 1992).*
JP 08-167502 machine translation. (Year: 1996).*
"International Search Report (Form PCT/ISA/210)" of PCT/JP2016/087007, dated Feb. 21, 2017, with English translation thereof, pp. 1-4.
"Office Action of China Counterpart Application," dated Sep. 3, 2019, p. 1-p. 7.

* cited by examiner

QUANTITATIVE ANALYSIS

| ATOM | ATOMIC PERCENTAGE (atm%) |
|---|---|
| Ru | 47.7 |
| Si | 30.7 |
| Zn | 8.2 |
| Ba | 6.2 |
| Al | 6.7 |
| Ag | 0.3 |
| Pd | 0.3 |
| B | 0.0 |

THERMISTOR AND DEVICE USING THERMISTOR

CROSS-REFERENCE TO RELATED APPLICATION

This application is a 371 application of the international PCT application serial no. PCT/JP2016/087007, filed on Dec. 13, 2015, which claims the priority benefit of Japan Patent Application No. 2015-247882, filed on Dec. 18, 2015. The entirety of each of the abovementioned patent applications is hereby incorporated by reference herein and made a part of this specification.

TECHNICAL FIELD

The present invention relates to a thermistor suitable for detecting a temperature of a heat source such as an exhaust gas and a device using the thermistor.

BACKGROUND ART

In a variety of thermal equipment having a heat source, a thermistor is used as a temperature sensor which detects and measures a temperature of the heat source and controls the equipment.

For example, a temperature sensor using a thermistor composition (thermistor element) as a temperature sensing element is used to measure an exhaust gas (heat source) of a vehicle or the like equipped with a diesel engine. Generally, in such a temperature sensor, a metallic electrode is formed in the thermistor composition, and a lead wire (wiring) is connected to the electrode.

In this case, noble metals such as platinum (Pt) and rhodium (Rh) which have excellent corrosion resistance and can be electrically conducted even under a high temperature environment are used for the lead wire. However, these noble metals are expensive and not advantageous from the viewpoint of manufacturing cost.

Meanwhile, a temperature sensor element in which a diffusion layer is formed on an interface between a thermistor and a metal electrode bonded to a surface of the thermistor to ensure junction reliability between the thermistor and the metal electrode and also to ensure ohmic contact has been proposed (refer to Patent Literature 1).

Further, a thermistor in which an electrode has a two-layer structure including an element electrode and a cover electrode and an element electrode containing ruthenium oxide ($RuO_2$) is stacked on a thermistor element has been proposed (refer to Patent Literature 2 and Patent Literature 3).

Further, a glass sealed type thermistor in which a thermistor element and a lead wire formed of a nickel coated Dumet wire or an Fe/Cr alloy wire are connected via an electrode is known (refer to Patent Literature 4).

REFERENCE LIST

Patent Literature

[Patent Literature 1]
Japanese Patent No. 5437304
[Patent Literature 2]
Japanese Patent No. 3661160
[Patent Literature 3]
Japanese Patent Application Laid-Open (JP-A) No. 2007-141881
[Patent Literature 4]
Japanese Patent No. 3650854

SUMMARY OF INVENTION

Technical Problem

However, in the conventional thermistors, no attention is paid to ensuring of the ohmic contact in a relationship between an electrode portion formed in the thermistor composition and the lead wire (wiring) connected to this electrode, and no consideration thereof has been made. Further, there is no disclosure of a specific configuration for ensuring the ohmic contact.

An objective of the present invention is to provide a thermistor capable of ensuring ohmic contact in a relationship between an electrode portion formed in a thermistor composition and a wiring connected to the electrode portion and thus capable of accurately detecting a temperature, and a device using the thermistor.

Further, another object of the present invention is to secure bonding reliability between a thermistor composition and a wiring.

Solution to Problem

A thermistor described in item 1 includes a thermistor composition, a pair of electrode portions formed on the thermistor composition and containing a noble metal, a wiring bonded to the electrode portion and having a passivation film formed on a surface thereof, and a bonding material configured to bond the wiring to the electrode portion and containing a noble metal oxide.

The noble metal contained in the electrode portion includes a noble metal such as silver (Ag), gold (Au), platinum (Pt) or the like, and a noble metal oxide such as ruthenium oxide ($RuO_2$).

According to a thermistor described in item 2, in the thermistor according to item 1, the electrode portion may be formed by the bonding material.

In this case, the bonding material has a function of bonding the wiring and a function as the electrode portion.

According to a thermistor described in item 3, in the thermistor according to item 1 or 2, an atomic percentage of a noble metal oxide in a composition of the bonding material may be 3 atm % to 60 atm %.

According to a thermistor described in item 4, in the thermistor according to any one of items 1 to 3, the noble metal oxide in the composition of the bonding material may be ruthenium oxide.

According to a thermistor described in item 5, in the thermistor according to any one of items 1 to 4, the composition of the bonding material may include at least silicon dioxide, zinc oxide and aluminum oxide.

According to a thermistor described in item 6, in the thermistor according to any one of items 1 to 5, glass contained in the composition of the bonding material may be crystallized glass.

According to a thermistor described in item 7, in the thermistor according to any one of items 1 to 6, the electrode portion may be covered with a protective layer of crystallized glass.

According to a thermistor described in item 8, in the thermistor according to any one of items 1 to 7, a linear expansion coefficient of the thermistor composition may be from $4.5 \times 10^{6}/°C$. to $10 \times 10^{-6}/°C$., a linear expansion coefficient of the bonding material may be from $5 \times 10^{-6}/°C$.

to $10 \times 10^6/°$ C., and a linear expansion coefficient of the wiring may be from $8 \times 10^{-6}/°$ C.

According to a thermistor described in item 9, in the thermistor according to any one of items 1 to 8, the wiring having the passivation film formed on the surface thereof may be an iron-based alloy.

A device using the thermistor corresponds to various devices equipped with a thermistor to detect various temperatures such as a temperature of an exhaust gas related to an automobile engine and to detect an internal temperature of an oven range. The devices to which the thermistor is applied are not limited.

Advantageous Effects of Invention

According to the embodiment of the present invention, it is possible to provide a thermistor capable of ensuring ohmic contact in a relationship between the electrode portion formed in the thermistor composition and the wiring connected to the electrode portion and thus capable of accurately detecting a temperature, and a device using the thermistor.

BRIEF DESCRIPTION OF DRAWINGS

In FIG. 6, (a) is a cross-sectional view illustrating the thermistor of the first embodiment, and (b) is a cross-sectional view illustrating a thermistor of a comparative example.

DESCRIPTION OF EMBODIMENTS

Figure 1:
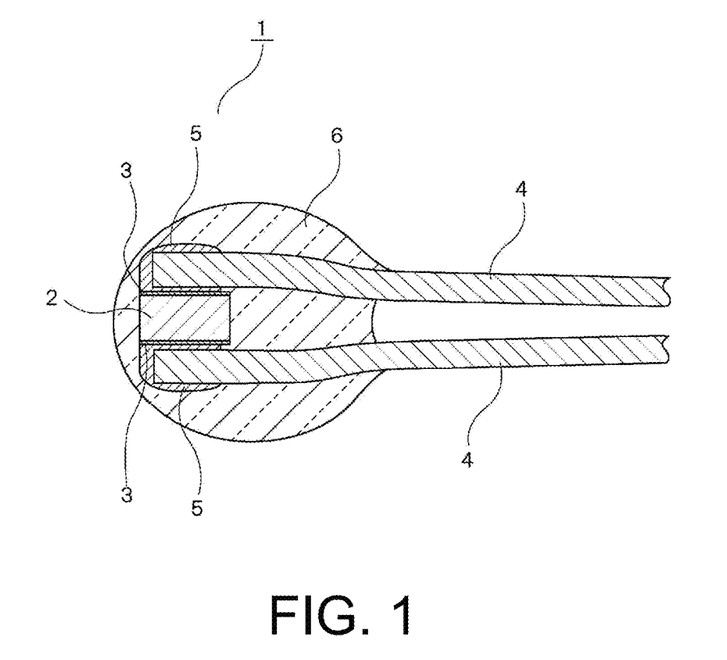
FIG. 1 is a cross-sectional view of a thermistor according to a first embodiment of the present invention.
Figure 2:
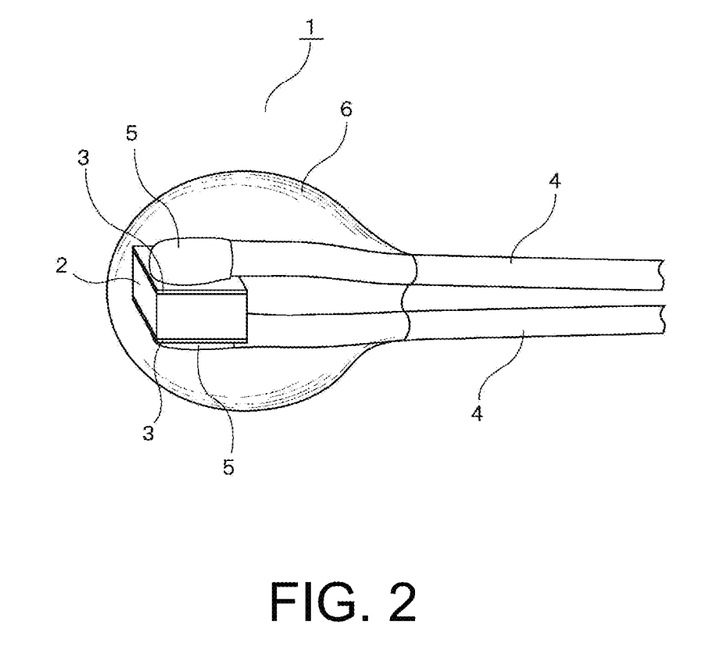
FIG. 2 is a perspective view illustrating the thermistor.
Figure 3:
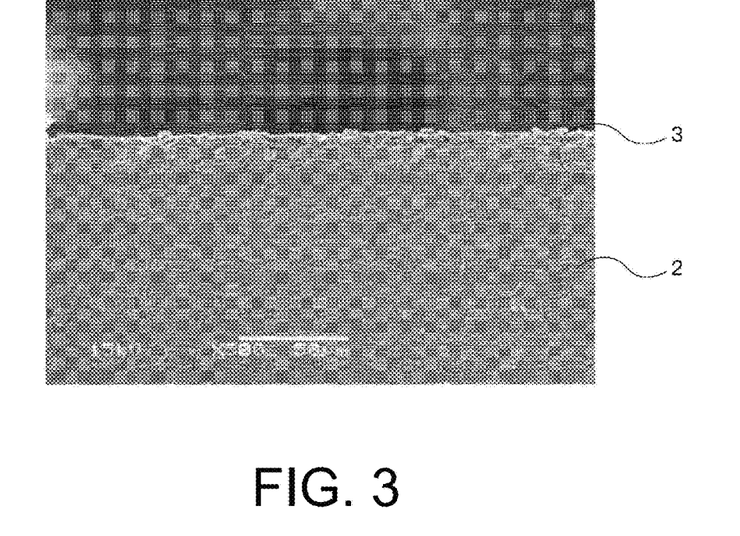
FIG. 3 is a photograph (500 times) illustrating side observation with an electron microscope in the thermistor.
Figure 4:
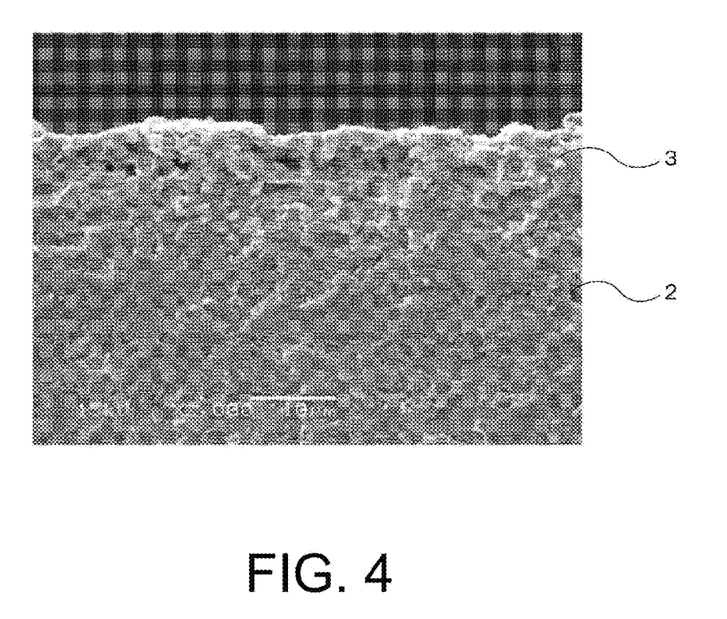
FIG. 4 is also a photograph (2000 times) illustrating side observation with an electron microscope.
Figure 5:
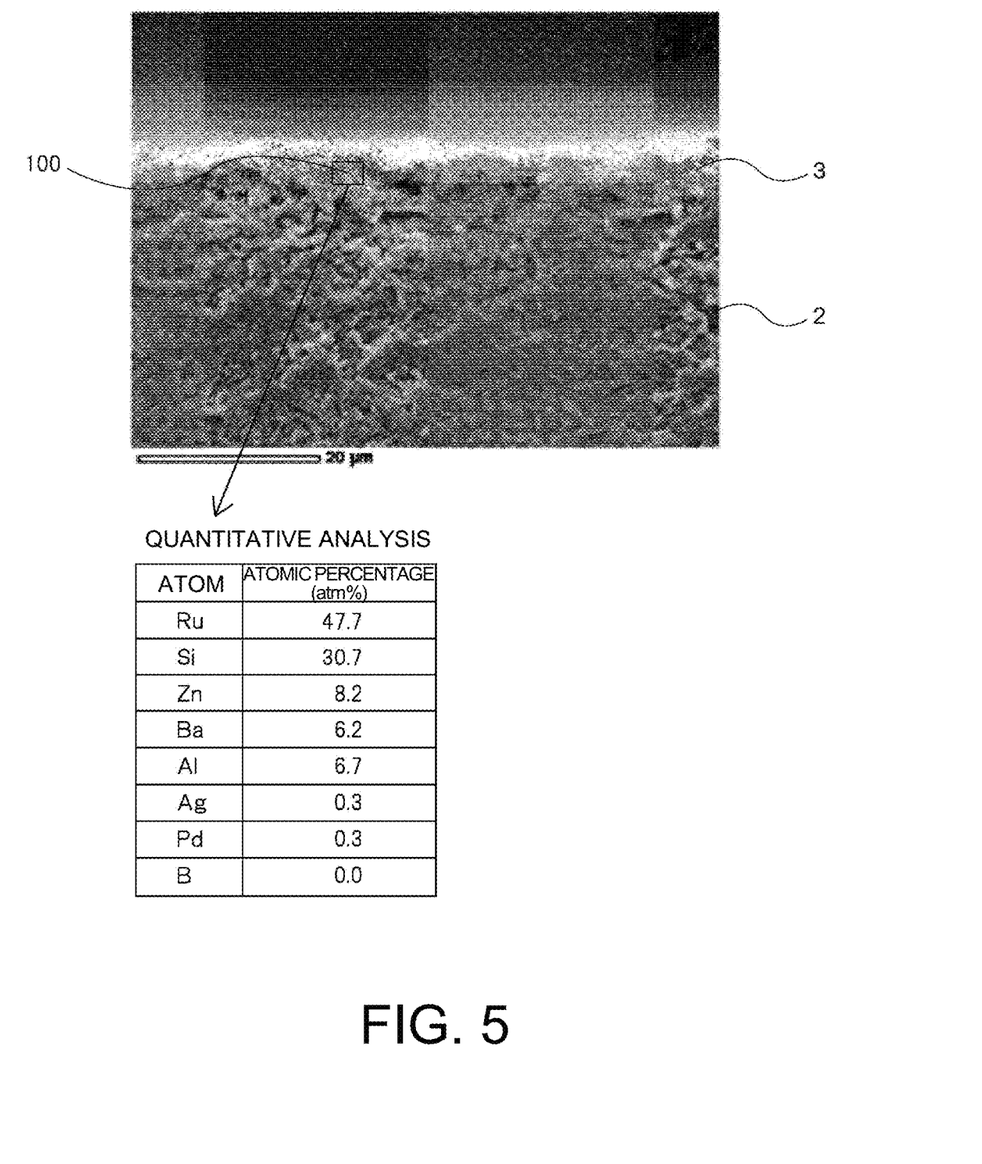
FIG. 5 is also a photograph (element mapping) illustrating side observation with an electron microscope.
Figure 6:
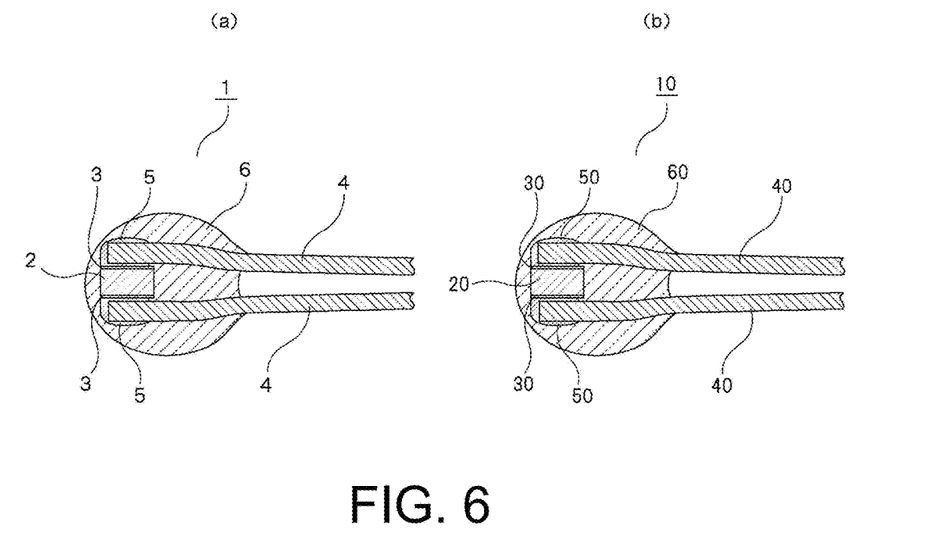
Figure 7:
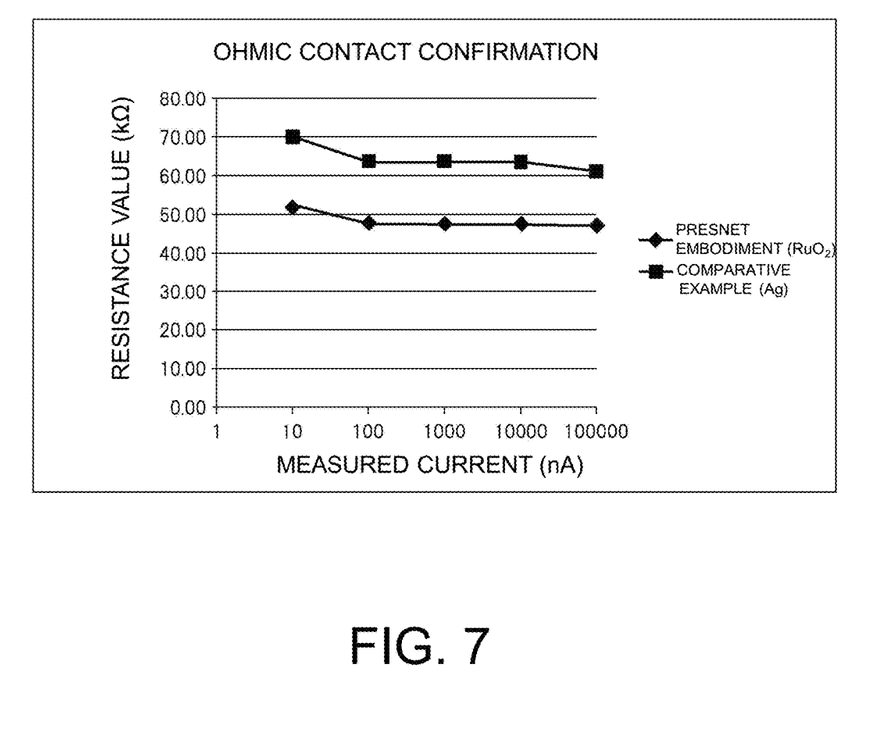
FIG. 7 is a graph illustrating an evaluation result of ohmic contact.

Hereinafter, a thermistor according to a first embodiment of the present invention will be described with reference to FIGS. 1 to 7. FIGS. 1 and 2 illustrate a thermistor, and FIGS. 3 to 5 illustrate side observation photographs of a thermistor composition and an electrode portion of the thermistor with an electron microscope. Further, FIGS. 6 and 7 illustrate evaluation results of ohmic contact. Furthermore, in the drawings, for the sake of explanation, a scale of each member is appropriately changed so that each member has a recognizable size.

As illustrated in FIGS. 1 and 2, a thermistor 1 is a temperature sensor and includes a thermistor composition 2, a pair of electrode portions 3, a wiring 4, a bonding material 5, and a glass sealing material 6.

The thermistor composition 2 is formed in a substantially rectangular parallelepiped shape, composed of two or more elements selected from transition metal elements such as manganese (Mn), nickel (Ni), cobalt (Co), iron (Fe), yttrium (Y), chromium (Cr), copper (Cu) and zinc (Zn) and composed of an oxide thermistor material containing a complex metal oxide having a crystal structure as a main component. In addition, accessory components for improving properties or the like may be contained. A composition and content of the main component and the accessory component can be appropriately determined according to desired properties.

Further, the thermistor composition 2 may be composed of silicon (Si)-based ceramics such as silicon carbide (SiC), silicon nitride ($Si_3N_4$), or the like. Furthermore, a shape of the thermistor composition 2 is not limited to a substantially rectangular parallelepiped shape but may be appropriately selected from a disk shape, a polygonal shape, and so on.

The pair of electrode portions 3 are formed to be stacked on one surface of the thermistor composition 2 and the other surface thereof opposite to the one surface. The electrode portion 3 contains a noble metal of a noble metal or a noble metal oxide such as silver (Ag), gold (Au), platinum (Pt), palladium (Pd), osmium (Os), iridium oxide ($IrO_2$), rhodium oxide ($Rh_2O_3$) and ruthenium oxide ($RuO_2$). Specifically, the electrode portions 3 are formed by baking a paste containing ruthenium oxide ($RuO_2$) which is a noble metal or a noble metal oxide and glass frit as main components on a surface of the thermistor composition 2. Also, crystallized glass having a high heat resistant temperature is used for the glass frit. Further, an insulating protective layer formed of crystallized glass having high heat resistance may be provided on the electrode portion 3. Accordingly, the electrode portion 3 is coated with and protected by the protective layer formed of the crystallized glass.

In the embodiment, the wiring 4 is a lead wire and is bonded to the thermistor composition 2, more specifically, the electrode portion 3, by a bonding material 5 and electrically connected thereto. The wiring 4 has a function of electrically connecting the thermistor composition 2 with an external control circuit (not illustrated) and is not limited to what is referred to as a lead wire but may be a signal line, an external lead terminal, or the like.

The wiring 4 is formed of a metal material on a surface of which a passivation film of an oxide film is formed. For example, an alloy which is an iron (Fe)-based alloy and contains at least one element selected from metal elements such as Cr, Co, Ni, Al, Mo, Cu, Ti, Si and so on is used.

In the embodiment, an alloy of iron (Fe) and chromium (Cr) (Fe—Cr alloy) containing Cr at about 20 weight % of Cr is used. Further, stainless steel can also be used. In this case, SUS 410 (JIS standard), SUS 430 (JIS standard) and so on can be properly used. These materials have a feature that a nonconductor film is formed even under a high temperature environment and does not easily oxidize.

The bonding material 5 serves to bond the wiring 4 to the electrode portion 3 and to connect them electrically. The bonding material 5 is formed on the electrode portion 3 to cover an end portion of the wiring 4 disposed in the electrode portion 3. Further, the bonding material 5 contains ruthenium oxide ($RuO_2$) as a noble metal oxide and is applied to the end portion of the wiring 4. Specifically, the bonding material 5 is formed by baking a paste containing ruthenium oxide ($RuO_2$) and glass frit of crystallized glass as main components.

In addition, parts of the thermistor composition 2, the electrode portion 3, the bonding material 5 and the wiring 4 is preferably sealed with the glass sealing material 6. Crystallized glass or the like having a high heat resistant temperature is used for the glass sealing material 6. Accordingly, the thermistor composition 2 and so on can be effectively protected even when used in a high temperature environment.

An example of a schematic manufacturing method of the thermistor 1 configured as described above will be described.

A binder is added to a material of the thermistor composition containing a metal oxide to prepare a mixed raw material. Then, the mixed raw material is molded and baked to obtain the thermistor composition 2 having a predetermined dimension.

Next, a paste containing ruthenium oxide ($RuO_2$) and glass frit as main components is applied by screen printing on a pair of opposing surfaces of the thermistor composition 2, dried, heat treated at a temperature of 800° C. to 900° C. and baked to form the electrode portion 3. Further, the electrode portion 3 may be formed by a thin film forming technique such as vapor deposition and sputtering without using the screen printing. In the case in which the electrode portion 3 is formed using the thin film forming technique, the electrode portion 3 may be a multilayer film structure containing a noble metal such as Cr/Cu/Au.

The wire 4 is an Fe—Cr alloy and is dipped in the bonding material 5 of the paste containing the ruthenium oxide ($RuO_2$), and then the wirings 4 are bonded and fixed to each other with the thermistor composition 2 having the electrode portion 3 interposed therebetween. Specifically, the bonding material 5 of the paste applied to cover the wiring 4 is dried, heat-treated at a temperature of 800° C. to 900° C., and baked and bonded. After that, the thermistor composition 2 is sealed with the glass sealing material 6. When crystallized glass is used for the electrode portion 3, the bonding material 5 and the glass sealing material 6, it is baked and sealed at a temperature of about 1000° C.

Further, when the wiring 4 is bonded, the wiring 4 may be disposed to be in contact with the electrode portion 3, and then the bonding material 5 may be applied to the wiring 4 and baked to be bonded to the electrode portion 3.

Further, since the thermistor composition 2, the electrode portion 3 and the bonding material 5 which constitute the thermistor 1, and the wiring 4 on which the passivation film is foiled have excellent oxidation resistance, it is possible to manufacture the thermistor 1 through a process such as a heat treatment in an oxidizing atmosphere (in the air). Also, the oxidation resistance performance can be exhibited even when the thermistor 1 is used in a high temperature environment.

Next, referring to FIG. 3 to FIG. 5, a side observation photograph of an electron microscope with respect to the thermistor composition 2 in the thermistor 1 and the electrode portion 3 stacked on the thermistor composition 2 will be described. FIG. 3 illustrates a photograph enlarged 500 times, FIG. 4 illustrates a photograph enlarged 2000 times, and FIG. 5 illustrates results of quantitative analysis by element mapping using characteristic X-rays.

As illustrated in FIG. 5, it can be understood that, in an analysis range 100, Ru is 47.7 atm %, Si is 30.7 atm %, Zn is 8.2 atm %, Ba is 6.2 atm %, Al is 6.7 atm %, Ag is 0.3 atm %, and Pd is 0.3 atm %.

Next, results of evaluating and confirming the ohmic contact of the thermistor 1 will be described with reference to FIGS. 6 and 7. (a) of FIG. 6 illustrates the thermistor 1 of the embodiment, and (b) of FIG. 6 illustrates a sample of a thermistor 10 of a comparative example. FIG. 7 illustrates results of confirming the ohmic contact of the thermistor 1 and the thermistor 10.

The thermistor 10 illustrated in (b) of FIG. 6 includes a thermistor composition 20, a pair of electrode portions 30, a wiring 40, a bonding material 50, and a glass sealing material 60. The thermistor 10 has substantially the same configuration the thermistor 1 of the embodiment, but the electrode portion 30 is formed by baking a paste containing ruthenium oxide ($RuO_2$) and glass frit as main components on a surface of the thermistor composition 20, and the wiring 40 is bonded to the electrode portion 30 with a bonding material 50 of a paste containing silver (Ag) and glass frit as main components.

With respect to the thermistor 1 and the thermistor 10 as described above, a resistance value between each pair of wirings 4 and 40 was measured while a current was changed. The resistance value of each of the thermistor compositions 2 and 20 was 50 kΩ, and the measurement results are illustrated in FIG. 7.

In FIG. 7, a vertical axis indicates the resistance value (kΩ), and a horizontal axis indicates the measured current (nA). As illustrated in FIG. 7, in the thermistor 1 of the embodiment, it is understood that the ohmic contact is ensured up to the measured current of 100 nA to 100 000 nA. That is, it can be understood that the resistance value is constant at approximately 50 kΩ and follows Ohm's law, regardless of variations in current and voltage, when the measured current is between 100 nA and 100 000 nA. Therefore, it can be confirmed that the ohmic contact is ensured. Further, when the measured current is around 10 nA, a semiconductive electrical barrier is considered to be present at a junction interface.

On the other hand, in the thermistor 10 of the comparative example, when compared with the thermistor 1 of the embodiment, the resistance value of 10 kΩ to 20 kΩ is large, moreover, the resistance value is not constant in the measured current between 100 nA and 100 000 nA, and it tends to decrease as the measured current increases. Therefore, it can be understood that it is difficult to ensure the ohmic contact in the thermistor 10 of the comparative example.

From the results of evaluation and confirmation as described above, it can be determined that the ohmic contact is ensured at least at the interface between the electrode portion 3 and the wiring 4 in the thermistor 1 of the embodiment.

Regarding the connection between the electrode portion 3 and the wiring 4, the inventors of the present invention have searched a large number of materials to realize a configuration for ensuring the ohmic contact and have focused on ruthenium oxide ($RuO_2$) having both metallic conduction and semiconductive conduction as disclosed in the paper "Microstructure and conduction mechanism of $RuO_2$ thick film resistor" (Journal of the Institute of Electrical Engineers of Japan, A. Vol. 109 (1989) No. 3 P111-118). Thus, the experiment and evaluation as described above were repeated to realize the configuration for ensuring the ohmic contact.

The reason why the ohmic contact can be ensured is estimated to be that the interface between the bonding material 5 containing the ruthenium oxide ($RuO_2$) and the wiring 4 of the Fe—Cr alloy in which the passivation film of the oxide film is formed on the surface thereof has contact between oxide semiconductors and the barrier becomes small so that the semiconductive conduction can be expected.

Further, from the results of the evaluation and confirmation, as a matter of course, it can be determined that the ohmic contact is also ensured at the interface between the thermistor composition 2 and the electrode portion 3. Also in this case, it is considered that the interface has the contact between the oxide semiconductors and the barrier becomes small.

Further, in the electrode portion 3 and the bonding material 5 when the ruthenium oxide ($RuO_2$) is contained, it is considered preferable for an atomic percentage of the ruthenium oxide ($RuO_2$) in the composition to be from 3 atm % to 60 atm %. The electrode portion 3 and the bonding material 5 having both the metallic conduction and the semiconductive conduction can be obtained within this range.

As noble metal oxides other than ruthenium oxide ($RuO_2$), iridium oxide ($IrO_2$), rhodium oxide ($Rh_2O_3$), palladium oxide (PdO), and so on can also be expected to have the same effect.

Further, from the result of the quantitative analysis illustrated in FIG. 5, the composition of the glass frit in the electrode portion 3 and the bonding material 5 includes silicon dioxide ($SiO_2$), zinc oxide (ZnO), aluminum oxide ($Al_2O_3$), and so on.

In addition, a linear expansion coefficient ($\times 10^{-6}/°$ C.) of each member constituting the thermistor 1 can be set as follows according to a material of each member.

The thermistor composition 2 can be set to $4.5 \times 10^6/°$ C. to $10 \times 10^6/°$ C. the electrode portion 3 can be set to $5 \times 10^6/°$ C. to $10 \times 10^{-6}/°$ C., the wiring 4 can be set to $8 \times 10^6/°$ C. to $14 \times 10^6/°$ C., and the bonding material 5 can be set to $5 \times 10^6/°$ C. to $10 \times 10^{-6}/°$ C. In this range, thermal stress caused by a difference in the linear expansion coefficient can be minimized, and thus it is possible to ensure junction reliability of each member.

Figure 8:
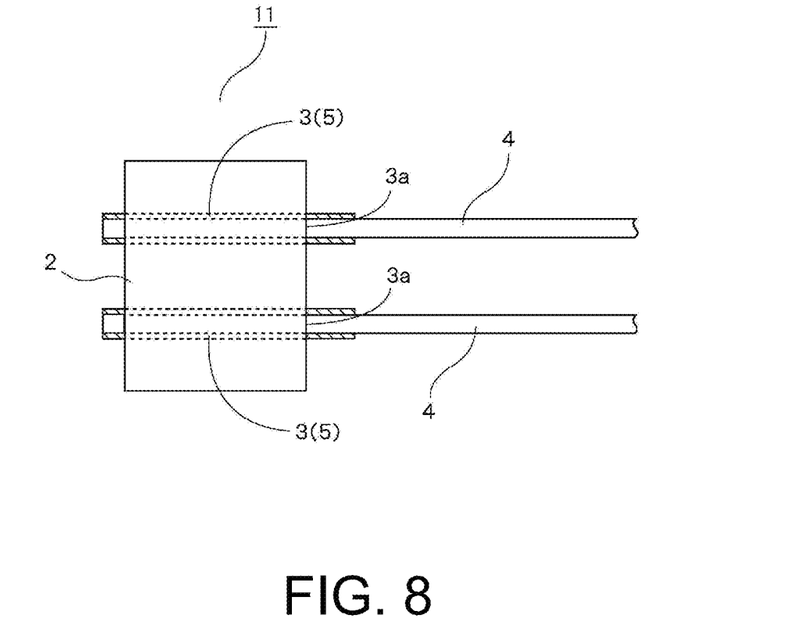
FIG. 8 is a side view illustrating a thermistor according to a second embodiment (Example 1) of the present invention.
Figure 9:
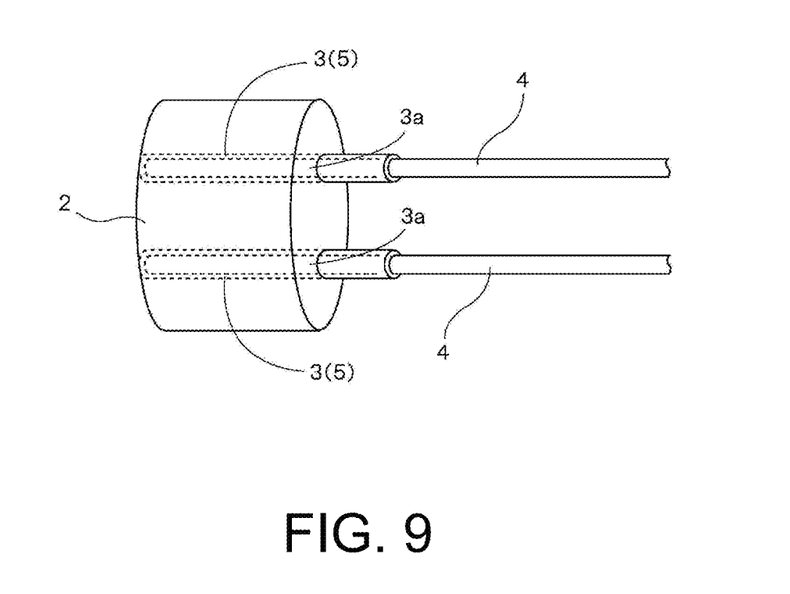
FIG. 9 is a perspective view illustrating the thermistor.
Figure 10:
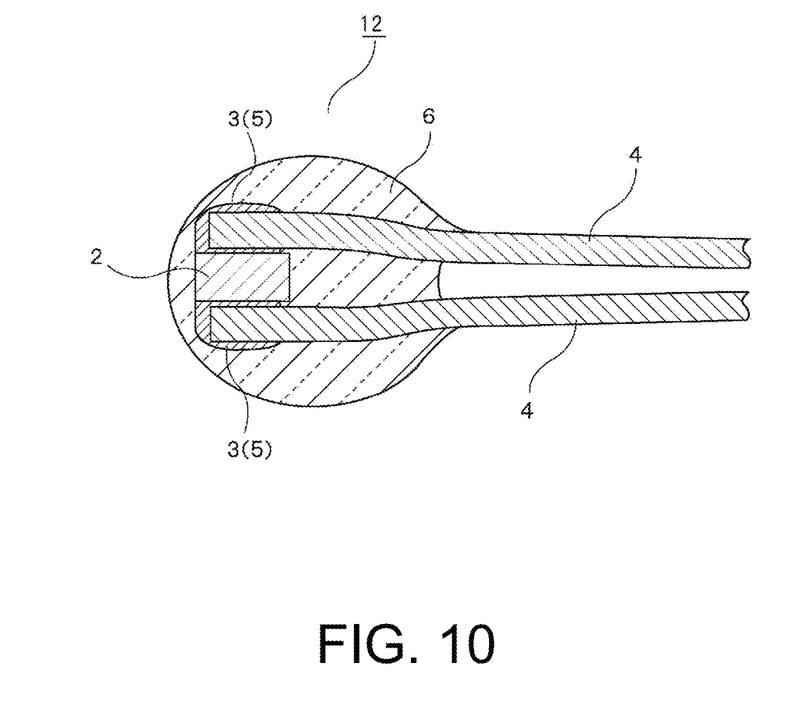
FIG. 10 is a cross-sectional view illustrating a thermistor according to the second embodiment (Example 2).

Next, a thermistor according to a second embodiment of the present invention will be described with reference to FIGS. 8 to 10. FIGS. 8 and 9 illustrate the thermistor of the first embodiment, and FIG. 10 illustrates a thermistor of a second embodiment. Further, the same or corresponding portions as those of the first embodiment are designated by the same reference numerals, and repeated descriptions thereof are omitted.

First Embodiment

As illustrated in FIGS. 8 and 9, a thermistor 11 has a thermistor composition 2, a pair of electrode portions 3, a wiring 4, and a bonding material 5. The thermistor composition 2 of the embodiment is formed in a substantially circular columnar shape, and a pair of through-holes 3a are formed from one surface thereof to the other surface.

After the wiring 4 is plated with the bonding material 5 and then inserted into the through-hole 3a, the bonding material 5 is heat-treated and baked, and the wiring 4 is bonded to the thermistor composition 2.

Further, in a state in which the bonding material 5 is applied to the through-hole 3a and the wiring 4 is then inserted thereinto, the bonding material 5 may be heat treated and baked to bond the wiring 4 to the thermistor composition 2.

Further, although not illustrated, like the first embodiment, parts of the thermistor composition 2, the electrode portion 3 (bonding material 5), and the wiring 4 are preferably sealed with a glass sealing material. For the glass sealing material, crystallized glass or the like having a high heat resistant temperature may be appropriately used according to a required heat resistant temperature.

In this state, the wiring 4 is connected to the thermistor composition 2 through the bonding material 5. That is, in this case, the bonding material 5 also forms the electrode portion 3, and thus the bonding material 5 has a function of bonding the wiring 4 and a function as the electrode portion 3. In other words, the bonding material 5 is also formed to serve as the electrode portion 3, and the wiring 4 is connected to the electrode portion 3 formed by the bonding material 5.

Second Embodiment

As illustrated in FIG. 10, a thermistor 12 includes a thermistor composition 2, a pair of electrode portions 3, a wiring 4, a bonding material 5, and a glass sealing material 6. The thermistor 12 of the embodiment basically has substantially the same structure as the thermistor 1 of the first embodiment. There is a difference in that, although the wiring 4 is bonded by the bonding material 5 as in the first embodiment, the bonding material 5 also forms the electrode portion 3 and has a function of bonding the wiring 4 and a function as the electrode portion 3. That is, the bonding material 5 is also formed to serve as the electrode portion 3, and the wiring 4 is connected to the electrode portion 3 formed by the bonding material 5.

Therefore, a detection output from the thermistor composition 2 is conducted to the thermistor composition 2—the bonding material 5 (electrode portion 3)—the wiring 4.

According to each of the above embodiments described above, in a relationship between the electrode portion 3 formed on the thermistor composition 2 and the wiring 4 connected to the electrode portion 3, it is possible to provide the thermistors 1, 11 and 12 capable of ensuring the ohmic contact and capable of accurately detecting a temperature.

In addition, it is possible to provide the thermistors 1, 11, and 12 which have good heat resistance and oxidation resistance and can ensure the junction reliability of each member.

The thermistors 1, 11, and 12 in the above-described embodiments can be provided and applied to various devices to detect various temperatures such as a temperature of an exhaust gas related to an automotive engine, to detect a catalyst temperature of a reformer of a fuel cell or the like, to detect an internal temperature of an oven range, to detect a temperature of a radiant heater, and so on. The devices to which the thermistors are applied are not limited.

The present invention is not limited to the above-described embodiments, and various modifications are possible within the scope of the present invention. Further, the above-described embodiments are presented as examples only and are not intended to limit the scope of the invention. These new embodiments can be implemented in a variety of other forms and can be abbreviated, replaced, or modified in various ways. These embodiments and modifications thereof are included in the scope and spirit of the invention and are also included within the scope of the claims and equivalents thereof as set forth in the claims.

The invention claimed is:

1. A thermistor, comprising:
   a thermistor composition;
   an electrode portion formed on the thermistor composition and containing a noble metal;
   a wiring bonded to the electrode portion and having an oxide film as a passivation film formed on a surface thereof; and
   a bonding material containing a noble metal oxide, disposed at least between the electrode portion and the wiring with ohmic contact to bond the wiring to the electrode portion.

2. The thermistor according to claim 1, wherein the electrode portion is formed by the bonding material.

3. The thermistor according to claim 1, wherein an atomic percentage of a noble metal oxide in a composition of the bonding material is 3 atm % to 60 atm %.

4. The thermistor according to claim 1, wherein the noble metal oxide in a composition of the bonding material is ruthenium oxide.

5. The thermistor according to claim 1, wherein a composition of the bonding material comprises at least silicon dioxide, zinc oxide, and aluminum oxide.

6. The thermistor according to claim 1, wherein a glass contained in a composition of the bonding material is crystallized glass.

7. The thermistor according to claim 1, wherein the electrode portion is covered with a protective layer of crystallized glass.

8. The thermistor according to claim 1, wherein a linear expansion coefficient of the thermistor composition is from $4.5\times10^{-6}/°C$ to $10\times10^{-6}/°C$, a linear expansion coefficient of the bonding material is from $5\times10^{-6}/°C$ to $10\times10^{-6}/°C$, and a linear expansion coefficient of the wiring is from $8\times10^{-6}/°C$ to $14\times10^{-6}/°C$.

9. The thermistor according to claim 1, wherein the wiring having the passivation film formed on the surface thereof is an iron-based alloy.

10. A device using a thermistor comprising the thermistor according to claim 1.

11. The thermistor according to claim 2, wherein an atomic percentage of a noble metal oxide in a composition of the bonding material is 3 atm % to 60 atm %.

12. The thermistor according to claim 2, wherein the noble metal oxide in a composition of the bonding material is ruthenium oxide.

13. The thermistor according to claim 3, wherein the noble metal oxide in a composition of the bonding material is ruthenium oxide.

14. The thermistor according to claim 2, wherein a composition of the bonding material comprises at least silicon dioxide, zinc oxide, and aluminum oxide.

15. The thermistor according to claim 3, wherein a composition of the bonding material comprises at least silicon dioxide, zinc oxide, and aluminum oxide.

16. The thermistor according to claim 4, wherein a composition of the bonding material comprises at least silicon dioxide, zinc oxide, and aluminum oxide.

17. The thermistor according to claim 2, wherein a glass contained in a composition of the bonding material is crystallized glass.

18. The thermistor according to claim 3, wherein a glass contained in a composition of the bonding material is crystallized glass.

19. The thermistor according to claim 4, wherein a glass contained in a composition of the bonding material is crystallized glass.

20. The thermistor according to claim 5, wherein a glass contained in a composition of the bonding material is crystallized glass.

* * * * *